United States Patent
Kamenetz et al.

(10) Patent No.: US 8,340,793 B2
(45) Date of Patent: Dec. 25, 2012

(54) ARCHITECTURE USING INTEGRATED BACKUP CONTROL AND PROTECTION HARDWARE

(75) Inventors: Jeffry K. Kamenetz, Windsor, CT (US); Gregory DiVincenzo, Putnam, CT (US); Mark A. Johnston, Windsor, CT (US); Jay W. Kokas, East Granby, CT (US); Luke T. Orsini, Marlborough, CT (US); Steven R. Fischer, North Granby, CT (US); Jay H. Hartman, New Hartford, CT (US); Kevin P. Roy, West Springfield, MA (US); William Betterini, Rocky Hill, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 294 days.

(21) Appl. No.: 12/791,163

(22) Filed: Jun. 1, 2010

(65) Prior Publication Data
US 2011/0087343 A1    Apr. 14, 2011

Related U.S. Application Data

(60) Provisional application No. 61/250,113, filed on Oct. 9, 2009.

(51) Int. Cl.
*G05B 9/02* (2006.01)
*G06F 11/00* (2006.01)

(52) U.S. Cl. ............... 700/82; 714/2; 714/4.4; 714/4.11
(58) Field of Classification Search ...... 714/2, 4.11–4.4; 700/82
See application file for complete search history.

(56) References Cited

U.S. PATENT DOCUMENTS

| | | | |
|---|---|---|---|
| 3,978,659 A | 9/1976 | Smith et al. | |
| 4,029,952 A | 6/1977 | Giras et al. | |
| 4,197,427 A * | 4/1980 | Hutcheson et al. | 379/133 |
| 4,521,871 A | 6/1985 | Galdun et al. | |
| 4,562,528 A | 12/1985 | Baba | |
| 4,797,884 A | 1/1989 | Yalowitz et al. | |
| 4,798,267 A * | 1/1989 | Foster et al. | 187/389 |
| 4,890,284 A | 12/1989 | Murphy et al. | |
| 4,937,777 A | 6/1990 | Flood et al. | |
| 5,037,271 A | 8/1991 | Duchesneau et al. | |

(Continued)

FOREIGN PATENT DOCUMENTS
GB    2158613    11/1985

OTHER PUBLICATIONS

Extended European Search Report dated Apr. 27, 2011, 10 page.

(Continued)

*Primary Examiner* — Charles Kasenge
*Assistant Examiner* — Thomas Stevens
(74) *Attorney, Agent, or Firm* — Carlson, Gaskey & Olds PC

(57) ABSTRACT

An electronic control configuration includes at least one secondary microprocessor operable to control a device. The at least one secondary microprocessor assumes protection control of the device responsive to a first type of failure by transmitting a protection control signal to a first effector. The at least one secondary microprocessor assumes backup control of the device responsive to a second type of failure by transmitting a backup control signal to a second effector. The backup control functionality of the at least one secondary microprocessor can be selectively disabled.

20 Claims, 5 Drawing Sheets

U.S. PATENT DOCUMENTS

| | | | |
|---|---|---|---|
| 5,128,943 A | | 7/1992 | Tulpule et al. |
| 5,185,866 A | * | 2/1993 | Francisco .................... 710/100 |
| 5,192,873 A | | 3/1993 | Wrenbeck et al. |
| 5,212,784 A | * | 5/1993 | Sparks ......................... 714/6.12 |
| 5,274,554 A | * | 12/1993 | Takats et al. ................. 701/29.2 |
| 5,279,107 A | | 1/1994 | Meisner et al. |
| 5,485,576 A | * | 1/1996 | Fee et al. ........................ 714/56 |
| 5,796,936 A | * | 8/1998 | Watabe et al. ................ 358/1.9 |
| 6,059,528 A | | 5/2000 | Danielson |
| 6,122,157 A | * | 9/2000 | Gerlach ........................ 361/124 |
| 7,984,878 B2 | * | 7/2011 | Hirvonen ...................... 244/194 |
| 8,074,101 B1 | * | 12/2011 | Vohra et al. .................... 714/5.1 |
| 2004/0153844 A1 | * | 8/2004 | Ghose et al. .................... 714/42 |
| 2005/0225165 A1 | * | 10/2005 | Naik et al. ...................... 303/20 |
| 2006/0242200 A1 | * | 10/2006 | Horowitz et al. .......... 707/104.1 |

OTHER PUBLICATIONS

European Search Report dated Jul. 11, 2012 for EP Application No. 12169884.9-2224, 5 pages.

* cited by examiner

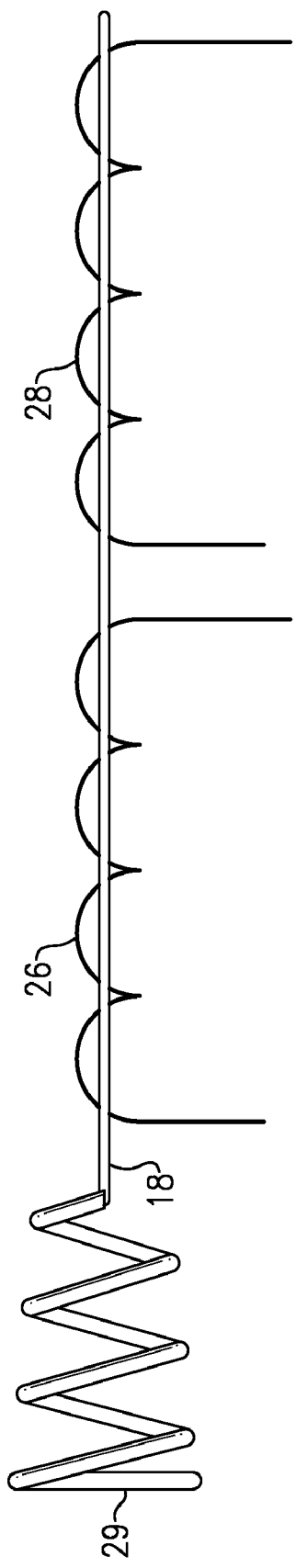
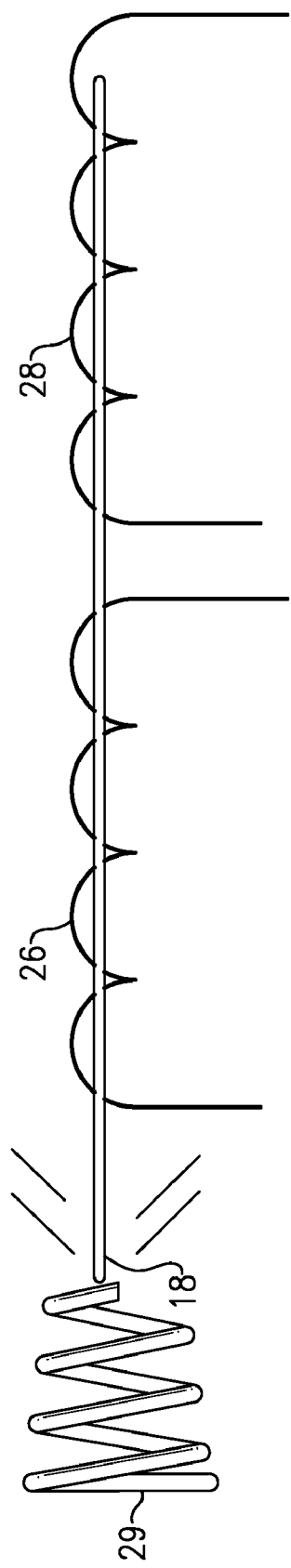
FIG.2a
FIG.2b

ARCHITECTURE USING INTEGRATED BACKUP CONTROL AND PROTECTION HARDWARE

This disclosure claims priority to U.S. Provisional Application No. 61/250,113 which was filed on Oct. 9, 2009.

BACKGROUND

This disclosure relates to controls, and more particularly to an electronic control architecture using integrated protection and backup control hardware.

Existing electronic controls utilize a primary control, a protection control, and an external backup control to control a device, also known as a "plant." Under normal fault-free conditions the primary control controls the plant, and the protection control may assume control if the primary control malfunctions in a "non-gross" manner (i.e., the primary control is still operating but is experiencing an undetected error and requires assistance from the protection control to compensate for the error). The protection control is sometimes referred to as a "nanny", because the protection control prevents unacceptable behavior by the primary control. The external backup control may assume control if the primary control experiences some threshold degree of damage or error from which the primary control cannot recover (e.g., a "gross error" which occurs if the primary control is unable to operate due to a channel-wide failure such as a primary control processor failure or a power supply failure).

SUMMARY

An example electronic control configuration includes at least one secondary microprocessor operable to control a device. The at least one secondary microprocessor assumes protection control of the device responsive to a first type of failure by transmitting a protection control signal to a first effector. The at least one secondary microprocessor assumes backup control of the device responsive to a second type of failure by transmitting a backup control signal to a second effector. The backup control functionality of the at least one secondary microprocessor can be selectively disabled.

These and other features of the present invention can be best understood from the following specification and drawings, the following of which is a brief description.

BRIEF DESCRIPTION OF THE DRAWINGS

FIG. 2a schematically illustrates de-energized dual-coil solenoid windings.

FIG. 2b schematically illustrates energized dual-coil solenoid windings.

FIG. 3 schematically illustrates switching logic for a first channel of the control configuration of FIG. 1a.

FIG. 4 schematically illustrates switching logic for a second channel of the control configuration of FIG. 1a.

DETAILED DESCRIPTION

Figure 1A:
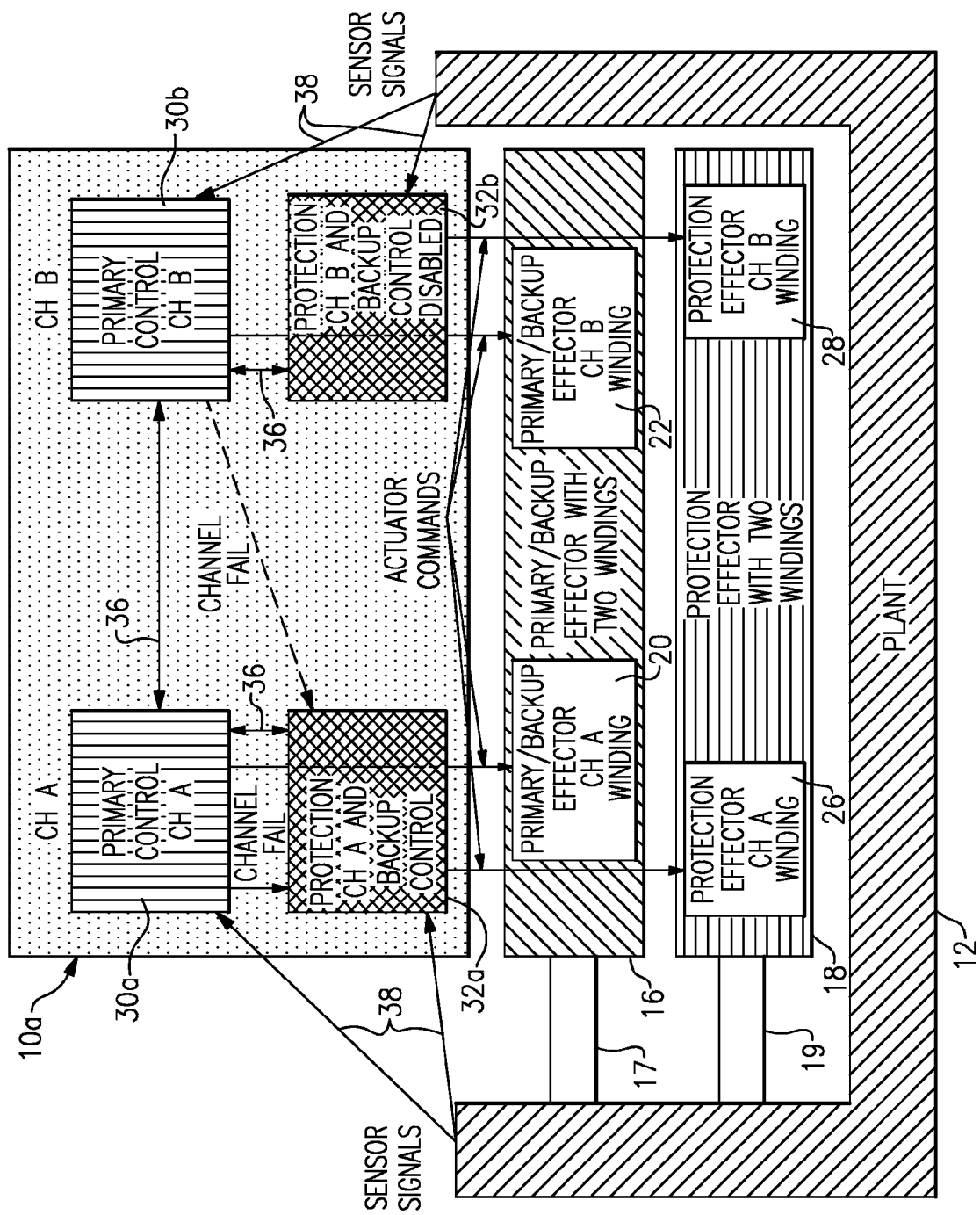
FIG. 1a schematically illustrates an electronic control configuration utilizing a combined protection and backup control unit, in which Channel A has an enabled backup and Channel B has a disabled backup control.

FIG. 1a schematically illustrates a multi-channel electronic control configuration 10a for a controllable device 12, also known as a "plant." The device 12 is controllable by a first, protection effector 18 along a shaft 19 and a second, primary/backup effector 16 along a shaft 17. Using the example of an aircraft, the device 12 could collectively refer to controllable mechanical components of the aircraft, such as a turbine engine, a gearbox, a mechanical fuel control valve, or another mechanically controllable device. In other examples, the device 12 could correspond to a controllable automobile, a power plant, or a building that includes anti-vibration actuators.

The effector 16 may be controlled via one of two windings 20, 22, and the protection effector 18 may be controlled via one of two windings 26, 28. In one example the windings 20, 22 are dual stepper motor windings and the windings 26, 28 are dual solenoid windings (see FIGS. 2a-b). Of course, other configurations are also possible, and the windings may correspond to other devices, such as dual torque motor windings.

FIG. 2a schematically illustrates the windings 26, 28 as de-energized dual-coil solenoid windings, such that the effector 18 is in a first position and a bias member 29 (e.g., a spring) is in an expanded position. FIG. 2b schematically illustrates the windings 26, 28 as energized dual-coil solenoid windings, such that the effector 18 is moved to a second position and the bias member 29 is in a compressed position.

Referring again to FIG. 1a, a first primary control 30a for a first channel ("channel A"), a second primary control 30b for a second channel ("channel B"), a first protection/backup control 32a for the first channel ("channel A"), and a second protection/backup control 32b for the second channel ("channel B") are in communication with each other via a serial data bus 36, and are in communication with the device 12 to receive sensor signals via connections 38 (e.g., speed measurement and/or a temperature measurement). The protection/backup controls 32a-b are secondary controls as compared to the primary controls 30a-b. The dual-channel configuration offers redundancy and fault tolerance. In one example, the controls 30a-b, 32a-b include microprocessors. The primary controls 30a-b are operable to control the device 12 via effector 16. The protection/backup controls 32a-b are capable of performing a protection function by controlling device 12 via protection effector 18 if the primary controls 30a-b experience a first type of failure. The protection/backup controls 32a-b are capable of performing a backup control function by controlling device 12 via primary/backup effector 16 if both the primary controls 30a-b experience a second type of failure. This operation will now be described in greater detail.

In one example, the first type of failure is a failure in which one of the primary controls 30a-b is able to control the device 12 but requires assistance from its corresponding protection/backup control 32a-b to avoid damaging the device. The first type of failure includes non-gross failures that the failing primary control 30 is not able to detect. For example, the first type of failure may include a temporary failure of memory of the controls 30a-b (e.g., due to cosmic radiation), or may include one of the primary controls 30a-b erroneously measuring an operating speed of the device 12 (e.g., a primary control 30 determines that the device 12 is operating at 60% speed but the device 12 is actually operating at 120% speed). In the example of the overspeed condition due to erroneous speed detection, the protection/backup control 32 may assume protection control by reducing fuel flow to the device 12 such that the primary control 30 is still controlling the device but the corresponding protection/backup control 32 assists to prevent the primary control 30 from damaging the device 12, acting in a so-called "nanny" role.

In one example, the second type of failure is a failure in which one of the primary controls 30a-b is unable to control the device 12 and relinquishes control of the device 12 to either the other of the primary controls 30a-b or to one of the protection/backup controls 32a-b (i.e., a detected gross failure or detected non-gross failure). For example, the second type of failure may include a processor failure of the primary control 30a or 30b. When one of the primary controls 30a-b detects its own failure, the failing primary control 30a-b will annunciate its failure to the other primary control channel 30a or 30b or to its corresponding backup controller 32a (in the example of FIG. 1a the corresponding backup controller for both primary controls 30a-b is the protection/backup control 32).

During normal fault-free operating conditions, the first primary control 30a controls effector 16 via winding 20 by transmitting control signals to the winding 20. Per FIG. 1a, in the event of the first type of failure, both protection/backup controls 32a and 32b assume protection control of the protection effector 18 via winding 26 by transmitting a protection control signal to the windings 26, 28.

If the first primary control 30a experiences the second type of failure and the first primary control 30a cannot return to normal operation without being serviced or replaced, the first primary control 30a relinquishes control of the device 12 and the second primary control 30b assumes control of the effector 16 via winding 22. In the event of the first type of failure of the second primary control 30b, both of the protection/backup controllers 32a-b assume protection control of the backup effector 18 via the windings 26, 28.

In the configuration 10a (see FIG. 1a), if both the primary controls 30a-b experience the second type of failure, the protection/backup control 32a assumes backup control of the device 12 at the effector 16 via winding 20. In one example the protection/backup control 32a is only able to assume backup control if both of the primary controls 30a-b experience the second type of error, are able to detect that they are experiencing the error, and relinquish control of the device 12. In the example of the electronic control configuration 10a, although the protection/backup control 32b also has backup control capabilities, the backup control functionality of control 32b is disabled such that the control 32b only acts as a protection control. This simplifies the configuration 10a, because protection/backup controls 32a-b may be manufactured in large quantities, and then backup control functionality may be selectively disabled. Note, that in the configuration 10a, no external dedicated backup control unit is needed.

Figure 1B:
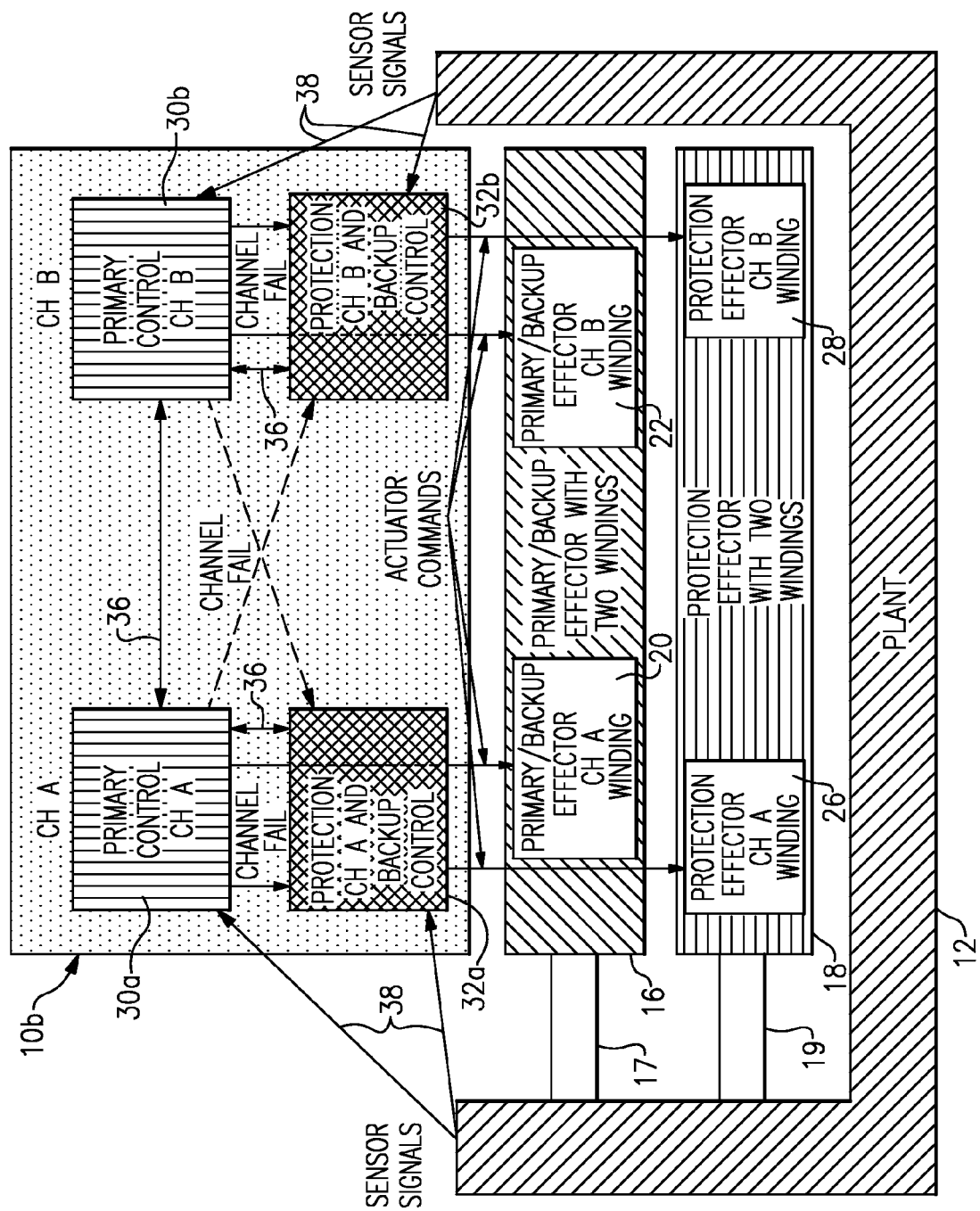
FIG. 1b schematically illustrates another electronic control configuration utilizing a combined protection and backup control unit, in which both Channel A and B have an enabled backup control.

In the configuration 10b (see FIG. 1b) the backup control functionality of the protection/backup control 32b is enabled such that either of the protection/backup controls 32a-b is operable to assume backup control from either of the primary controls 30a-b. In one example, the protection/backup control 32 that ultimately assumes protection control belongs to the channel of the primary control 30 that last had control (e.g., if primary control 30a last had control of the device 12 then protection/backup control 32a would be able to ultimately assume backup control, and if primary control 30b last had control of the device 12 then protection/backup control 32b would be able to ultimately assume backup control). In one example, the protection/backup control 32a is only able to assume backup control if both of the primary controls 30a-b experience the second type of error, are able to detect that they are experiencing the error, and relinquish control of the device 12. Note, that in the configuration 10b, as in the configuration 10a, no external dedicated backup control unit is needed.

Figure 3:
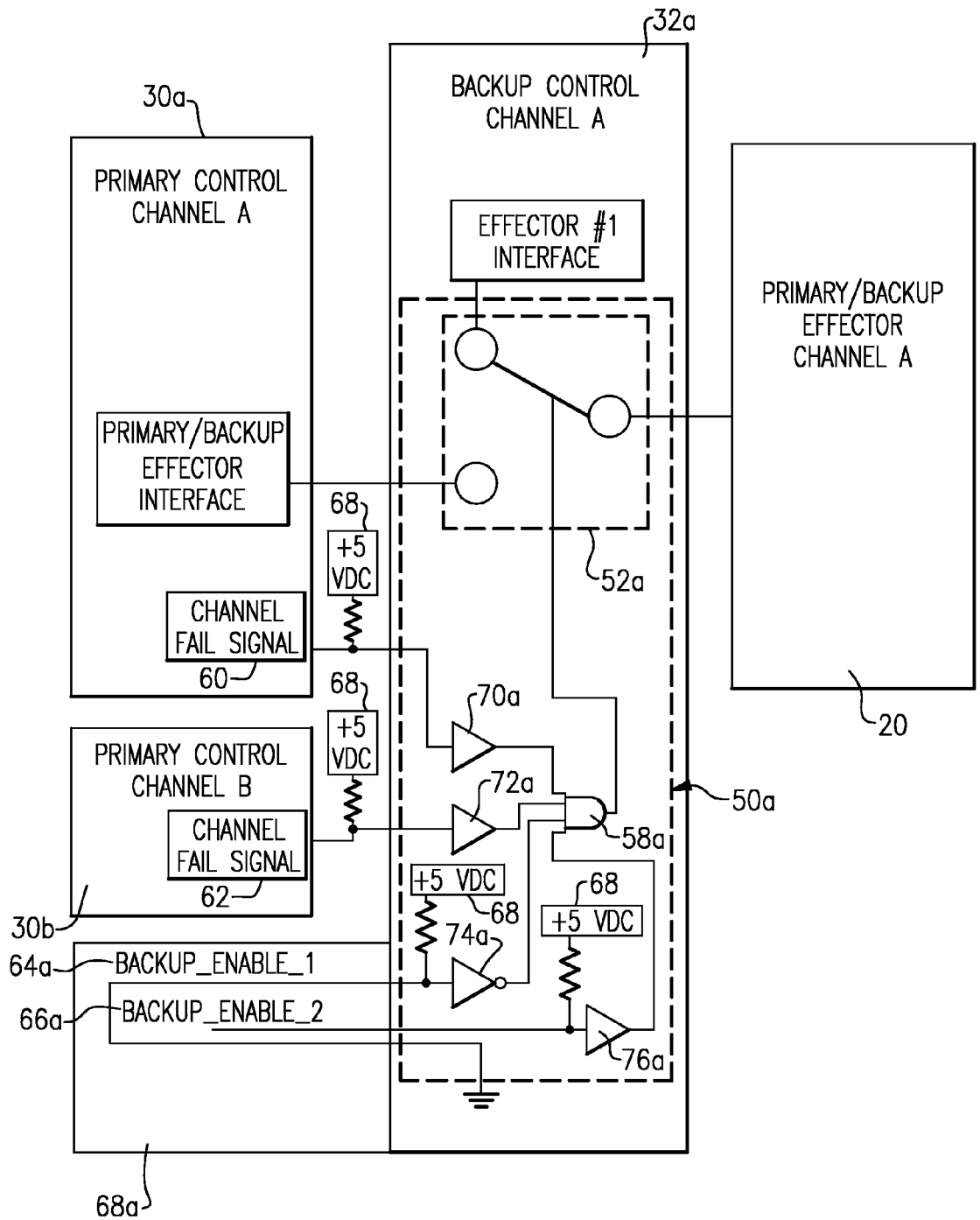
Figure 4:
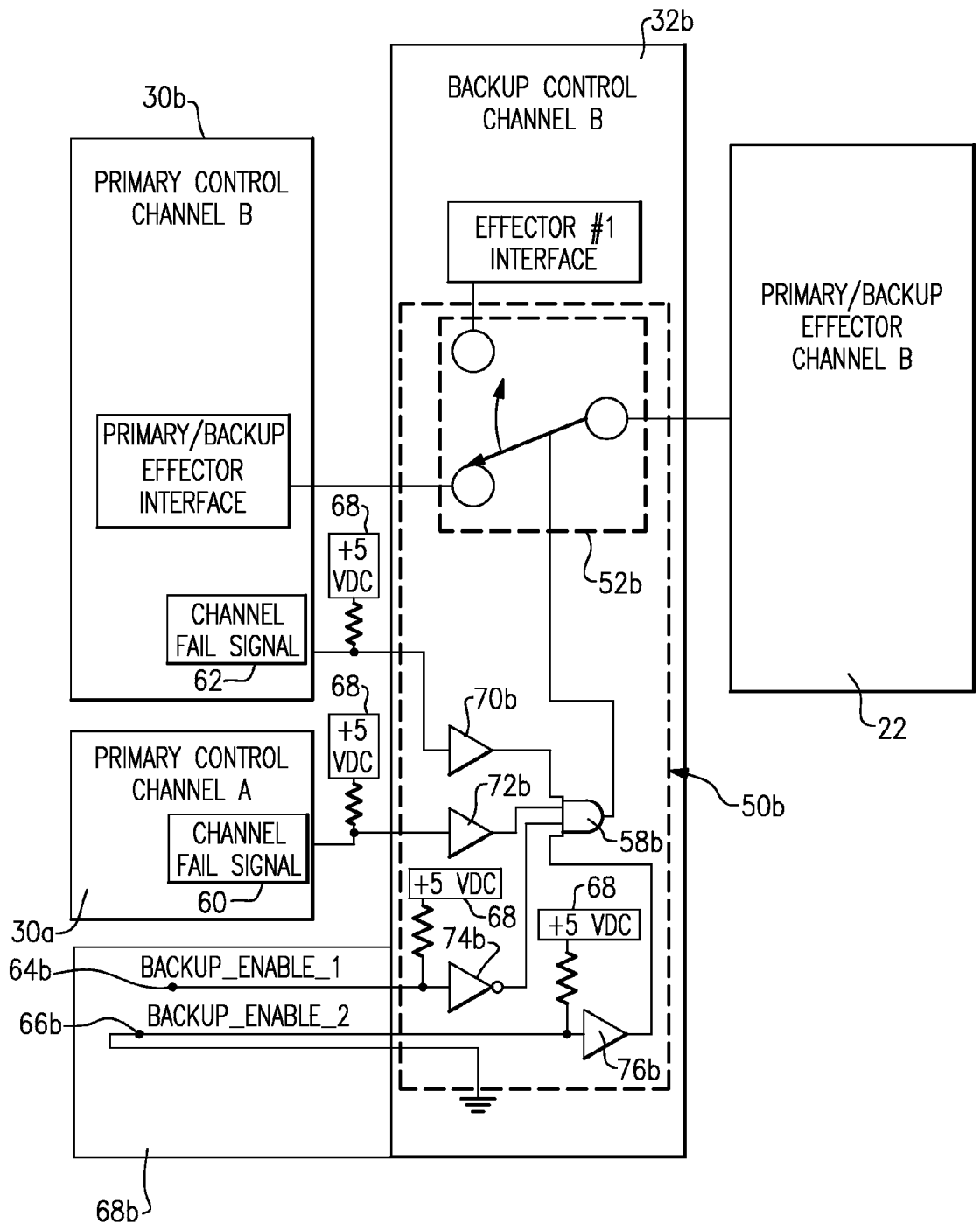

FIG. 3 schematically illustrates a control circuit 50a for the protection/backup control 32a of the configurations 10a-b that enables the backup functionality of the protection/backup control 32a via a switch 52a having a first position in which backup control functionality is enabled (see FIG. 3), and a second position in which backup control functionality is disabled (see FIG. 4). The switch 52a may be a solid state switch (e.g., MOSFET, IGBT, etc.), for example, or other type of switch (e.g., a relay). Notably, FIGS. 3 and 4 illustrate only the functional enabling/disabling of the backup control.

The switch 52a is controllable by an AND gate 58a. When the AND gate 58a output is high ("1"), the switch 52a is ON and the backup control functionality is enabled. When the AND gate 58a output is low ("0"), the switch 52a is OFF and the backup control functionality is disabled. The AND gate 58a only outputs an ON signal if each of its four inputs has an ON signal ("1").

The inputs of the AND gate 58a include primary control 30a channel fail signal 60, primary control 30b channel fail signal 62, a first backup enable signal 64a, and a second backup enable signal 66a. The signals 60, 62, 64a, 66a are each connected to a pull-up voltage 68. The signal 64a is connected to an inverter 74a. A buffer 70a is responsive to the fail signal 60 in that the buffer 70a only outputs a high output ("1") if the channel fail signal 60 is not asserted low ("0") to ground. Similarly, a buffer 72a is responsive to the fail signal 62 in that the buffer 72a only outputs a high output ("1") if the fail signal 62a is not asserted low ("0") to ground. For channel A of the two backup controllers (32a), the first backup signal 64a is always asserted to ground, and so inverter 74a always outputs a high output ("1"). For channel A of the two backup controllers (32a), the signal 66a is connected to a buffer 76a, not an inverter, and because the buffer 76a is connected to pull-up voltage 68, the buffer 76a always outputs a high output ("1"). Thus, the backup signals 64a, 66a always provide high inputs to the AND gate 58a, and whether the switch 52a is ON or OFF depends only upon whether or not the primary controls 30a-b indicate failure.

FIG. 4 schematically illustrates a control circuit 50b for the protection/backup control 32b of the configuration 10a that disables the backup functionality of the protection/backup control 32b via switch 52b having a first position in which backup control functionality is enabled (see FIG. 3), and a second position in which backup control functionality is disabled (see FIG. 4). The switch could be a solid state switch (e.g., MOSFET, IGBT, etc.), for example, or could be any other type of switch (e.g., a relay).

The switch 52b is controllable by an AND gate 58b. When the AND gate 58b output is high ("1"), the switch 52b is ON and the backup control functionality is enabled. When the AND gate 58b output is low ("0"), the switch 52b is OFF and the backup control functionality is disabled. The AND gate 58b is responsive to its four inputs in that the AND gate 58b only outputs an ON signal if each of its four inputs has an "ON" signal. However, the circuit 50b of FIG. 4 guarantees that the AND gate 58b only outputs an OFF signal, because inverter 74b will always have a low output ("0") (as signal 64b is always open for channel B in the configuration of FIG. 1a), and buffer 76b will always have a low output ("0") (as signal 66b is tied to ground for channel B in the configuration of FIG. 1a). Thus, with two inputs always being low, the AND gate 58b will always have an OFF output such that switch 52b disables the backup control functionality. However, in the configuration of FIG. 1b, the control circuit 50a of FIG. 3 would apply to both Channels A and B because the backup functionality of both of the protection/backup controls 32 is enabled.

Although only the protection/backup controls 32*a-b* have been described as having protection control functionality, it is also possible that the primary controls 30*a-b* could have built-in protection control functionality such that if primary control 30*a* experienced the first type of failure then primary control 30*b* could provide protection control, and if primary control 30*b* experienced the first type of failure then primary control 30*a* could provide protection control.

Also, although only two channel configurations 10*a-b* have been discussed, it is understood that the configurations 10*a-b* are only examples, and that other quantities of channels could be used.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An electronic control configuration, comprising:
   at least one primary microprocessor operable to control a device using a first shaft and a first effector; and
   at least one secondary microprocessor operable to control the device using a second shaft and a second effector, the at least one secondary microprocessor assuming protection control of the device responsive to a first type of failure by transmitting a protection control signal to the first effector, the at least one secondary microprocessor assuming backup control of the device responsive to a second type of failure by transmitting a backup control signal to the second effector, wherein the backup control functionality of the at least one secondary microprocessor can be selectively disabled.

2. The electronic control configuration of claim 1, wherein the first type of failure is a failure in which at least one primary control microprocessor is able to control the device but requires assistance from the at least one secondary microprocessor to avoid damaging the device, and wherein the second type of failure is a failure in which the at least one primary control microprocessor is unable to control the device and relinquishes control of the device to either another primary control microprocessor or the at least one secondary microprocessor.

3. The electronic control configuration of claim 2, wherein the at least one primary control microprocessor is operable to detect its own failure when the failure is the second type of failure, but is unable to detect its own failure when the failure is the first type of failure.

4. The electronic control configuration of claim 2, wherein first type of failure includes one or more of a temporary memory failure of the at least one primary control microprocessor, or the at least one primary control microprocessor erroneously measuring an operating speed of the device.

5. The electronic control configuration of claim 2, wherein the second type of failure includes a fault of the primary control microprocessor or a loss of a sensor input signal from the device.

6. The electronic control configuration of claim 2, wherein the at least one primary control microprocessor includes a first primary control microprocessor operable to control the device, and a second primary control microprocessor operable to control the device in response to the first primary control microprocessor experiencing the second type of failure.

7. The electronic control configuration of claim 6, wherein the at least one secondary microprocessor includes:
   a first secondary microprocessor operable to assume protection control of the device if the first primary control microprocessor experiences the first type of failure, and operable to assume backup control of the device if the first and second primary control microprocessors experience the second type of failure; and
   a second secondary microprocessor operable to assume protection control of the device if the second primary control microprocessor experiences the first type of failure, the second secondary microprocessor having its backup control functionality disabled.

8. The electronic control configuration of claim 6, wherein the at least one secondary microprocessor includes:
   a first secondary microprocessor operable to assume protection control of the device if the first primary control microprocessor experiences the first type of failure; and
   a second secondary microprocessor operable to assume protection control of the device if the second primary control microprocessor experiences the first type of failure, wherein either of the first secondary microprocessor or second secondary microprocessor is operable to assume backup control of the device if the first and second primary control microprocessors experience the second type of failure.

9. An electronic control configuration, comprising:
   at least one secondary microprocessor operable to control a device, the at least one secondary microprocessor assuming protection control of the device responsive to a first type of failure by transmitting a protection control signal to a first effector, the at least one secondary microprocessor assuming backup control of the device responsive to a second type of failure by transmitting a backup control signal to a second effector, wherein a backup control functionality of the at least one secondary microprocessor can be selectively disabled;
   wherein the first type of failure is a failure in which at least one primary control microprocessor is able to control the device but requires assistance from the at least one secondary microprocessor to avoid damaging the device, and wherein the second type of failure is a failure in which the at least one primary control microprocessor is unable to control the device and relinquishes control of the device to either another primary control microprocessor or the at least one secondary microprocessor; and
   wherein the at least one secondary microprocessor controls the device along a first shaft using the first effector, wherein the at least one primary control microprocessor controls the device along a second shaft using the second effector, wherein each of the first effector and the second effector include at least one of a stepper motor, a torque motor and a dual-coil solenoid.

10. The electronic control configuration of claim 9, wherein the at least one primary control microprocessor and the at least one secondary microprocessor communicate via a serial bus.

11. The electronic control configuration of claim 1, wherein the device is a mechanically-controllable component of a vehicle or a building.

12. An electronic control configuration, comprising:
   a first primary control operable to control a device using a first shaft and a first effector to control the device;
   a first secondary control operable to assume protection control of the device if the first primary control experiences a first type of failure;

a second primary control operable to control the device using a second shaft and a second effector in response to the first primary control experiencing a second type of failure; and a second secondary control operable to assume protection control of the device if the second primary control experiences the first type of failure, at least one of the secondary controls being operable to assume backup control of the device if both the first and second primary controls experience the second type of failure.

13. The electronic control configuration of claim 12, wherein each of the secondary controls have both backup and protection control functionality, and wherein the second secondary control has its backup protection features disabled.

14. The electronic control configuration of claim 12, wherein each of the secondary controls have both backup and protection control functionality, and wherein both of the first secondary control and the second secondary control have their backup protection features enabled.

15. The electronic control configuration of claim 12, wherein the first primary control and the first secondary control correspond to a first control channel, the first secondary control controlling the device along a first shaft using a first winding of a first effector, the first primary control controlling the device along a second shaft using a first winding of a second effector, and wherein the second primary control and the second secondary control correspond to a second control channel, the second secondary control controlling the device along the first shaft using a second winding of the first effector, and the second primary control controlling the device along the second shaft using a second winding of the second effector.

16. The electronic control configuration of claim 12, wherein the device is a mechanically-controllable component of a vehicle or a building.

17. A method of electronically controlling a device, comprising:

controlling a device using a first primary control microprocessor, a first shaft, and a first effector;

assuming protection control of the device using a first secondary microprocessor, the first shaft, and the first effector in response to the first primary control microprocessor experiencing a first type of failure;

controlling the device using a second primary control microprocessor, a second shaft, and a second effector in response to the first primary control microprocessor experiencing a second type of failure;

assuming protection control of the device using a second secondary microprocessor, the second shaft, and the second effector in response to the second primary control microprocessor experiencing the first type of failure; and assuming backup control of the device using one of the first secondary microprocessor and the second secondary microprocessor in response to the first primary control microprocessor and the second primary control microprocessor experiencing the second type of failure.

18. The method of claim 17, including:

disabling a backup control feature of the second secondary microprocessor.

19. The method of claim 17, wherein the first type of failure is a failure in which a primary control is able to control the device but requires assistance from its corresponding secondary control to avoid damaging the device, and wherein the second type of failure is a failure in which a primary control is unable to control the device and relinquishes control of the device to either the other primary control or to its corresponding secondary control.

20. The method of claim 17, wherein said step of assuming backup control of the device is only performed in response to each of the first primary control microprocessor and the second primary control microprocessor experiencing the second type of failure, acknowledging the occurrence of their respective failure, and relinquishing control of the device.

\* \* \* \* \*